A. SODERLUND.
METALLIC PISTON PACKING.
APPLICATION FILED DEC. 4, 1912.
1,088,737.
Patented Mar. 3, 1914.
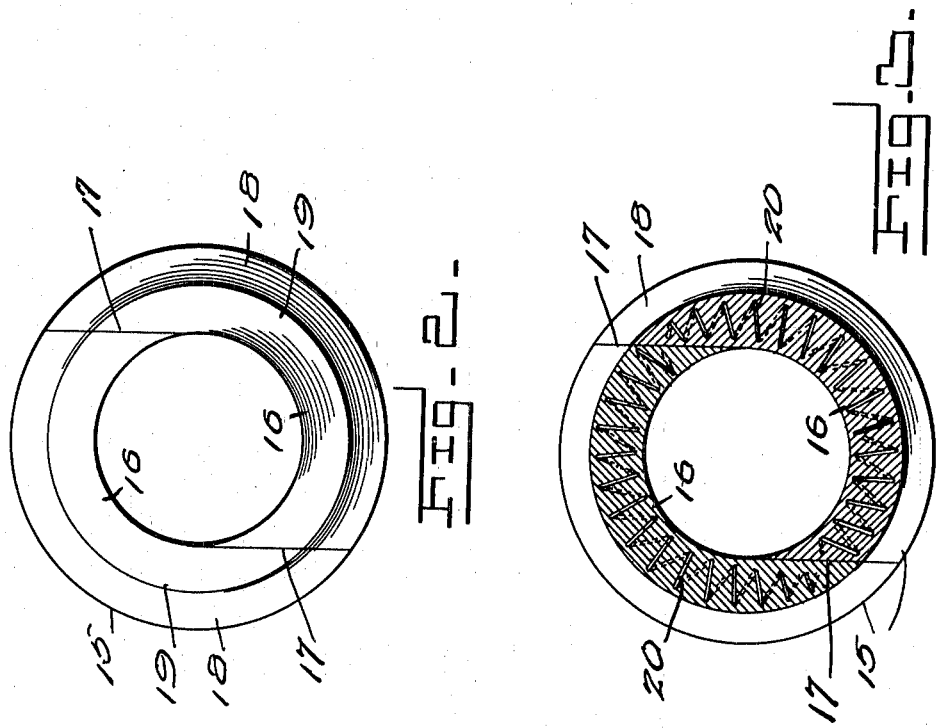
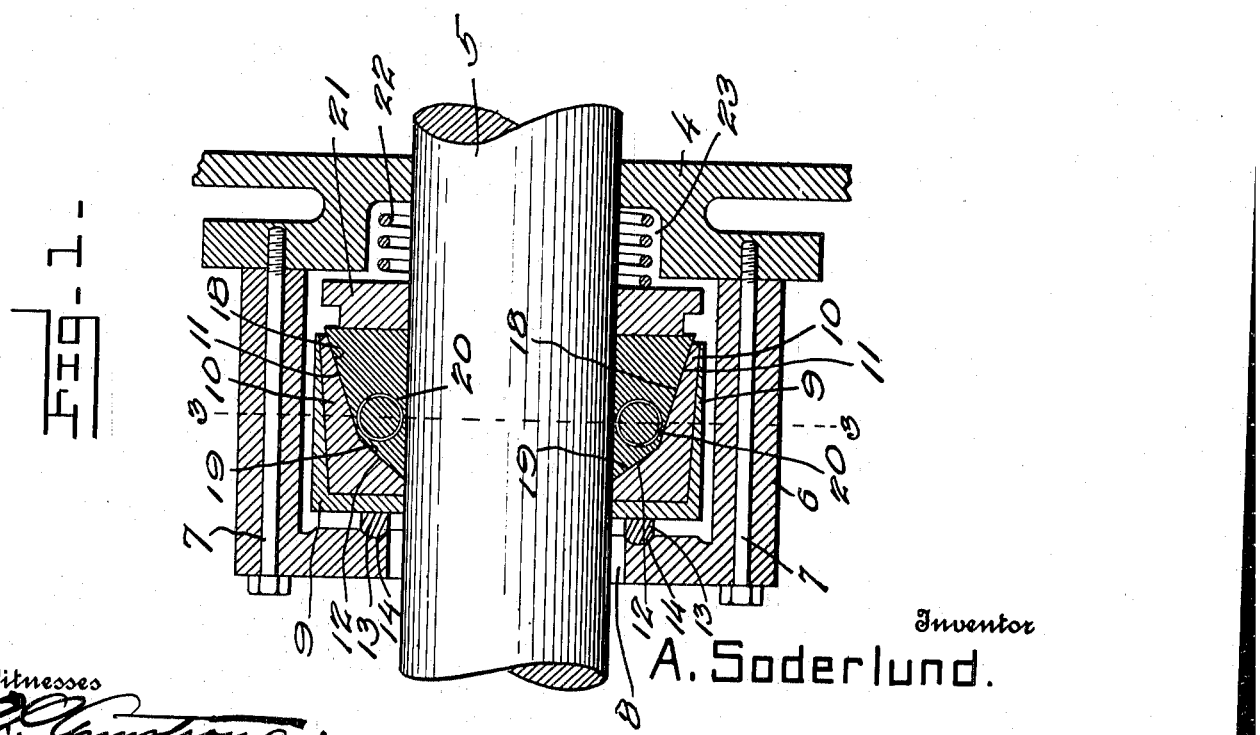

UNITED STATES PATENT OFFICE.

ALBERT SODERLUND, OF FITZGERALD, GEORGIA.

METALLIC PISTON-PACKING.

1,088,737.  Specification of Letters Patent.  Patented Mar. 3, 1914.

Application filed December 4, 1912. Serial No. 734,917.

*To all whom it may concern:*

Be it known that I, ALBERT SODERLUND, a citizen of the United States, residing at Fitzgerald, in the county of Ben Hill and State of Georgia, have invented certain new and useful Improvements in Metallic Piston-Packing, of which the following is a specification.

My invention relates to a novel form of packing means for piston rods or the like, to effectually prevent the escape or leakage of fluids about the piston rod.

An important object of this invention is to provide means of the above mentioned character, which are simple in construction, cheap to manufacture, and very durable.

A further object of my invention is to provide an improved form of packing ring, which is characterized by its simplicity, durability, and efficiency.

Other objects and advantages of my invention will be apparent during the course of the following description.

In the accompanying drawings forming a part of this application and in which like numerals are employed to designate like parts throughout the same, Figure 1 is a central vertical longitudinal sectional view through the packing means, Fig. 2 is a front end view of the packing ring, and, Fig. 3 is a transverse sectional view through the packing ring taken on line 3—3 of Fig. 1.

In the drawings, wherein for the purpose of illustration, I have shown a preferred embodiment of my invention, the numeral 4 designates an end or a head of a cylinder, through which reciprocates a piston rod 5, as shown. Surrounding the piston rod 5 is a housing or gland 6, connected with the head 4 by means of bolts 7 or the like. The union between the gland 6 and head 4 is steam tight. The gland or housing 6 is provided with an opening 8, which is much larger in diameter than the piston rod 5, as shown.

Disposed within the gland 6 is a vibratory casing 9, having an opening formed therethrough for the passage of the piston rod 5, as shown. This vibratory casing holds a vibratory cup 10, having inner walls 11 and 12, as shown. The wall 12 is disposed at substantially an angle of 45° with relation to a line drawn perpendicular to the piston rod 5, while the wall 11 is at an angle of substantially 75° with relation to this line.

The outer end of the vibratory casing 9 engages a spacing ring 13, having its outer surface curved or convex, to fit within a correspondingly concaved recess 14, formed in the material of the end of the gland 6. The spacing ring 14 thus has a ball joint with the end of the gland 6.

The numeral 15 designates my improved packing ring as a whole, which may be formed of Babbitt-metal or other suitable metallic material. This packing ring is formed in two twin sections 16, having straight end portions 17, which are cut at a tangent to the inner periphery of the ring, and are parallel, as clearly shown in Fig. 2.

An important feature of the construction of the packing ring is its specific shape in cross-section. As clearly shown in Fig. 1, each of the packing ring sections has two outer walls 18 and 19, as shown. The wall 19 is disposed at substantially 45° with relation to the perpendicular line to the piston rod while the wall 18 is disposed at an angle of substantially 75° to said line.

A particular advantage of the construction of my packing ring, is that the same will fit within the standard vibratory cup. By providing the packing ring with outer walls, which are arranged at different angles, as above stated, the single packing ring will serve the same function as a plurality of packing rings, at the same time being much simpler, easier to put in place and remove, and much more durable. Each of the packing ring sections 16 has a copper coil spring 20 embedded therein, as shown. The function of this coil spring is to give each packing ring section or segment a desired degree of resiliency and stiffness, to properly hold the same in engagement with the piston rod. Attention is called to the fact that this coil spring is so embedded within the packing ring section, that the same cannot come in contact with the piston rod. The large end of the packing ring 15 is disposed nearer the head 4, and is engaged by a sleeve or follower 21, surrounding the piston rod 5, as shown. This follower is engaged by a suitably stiff coil spring 22, disposed in a cavity or chamber 23, as shown.

In operation, as the piston rod 5 freely reciprocates, the packing ring 15 is free to partake of slight vibratory movements within the vibratory cup 10, the spring 22 being suitably resilient to allow of the proper movement of the packing ring. If the fluid should leak or escape about the piston rod 5, the same upon entering the housing or gland 6, will tend to move the sleeve 21 and packing ring 15 forwardly, thus positively preventing the escape of the fluid between the packing ring and the piston rod. Of course this fluid cannot escape about the spacing ring 13.

It is to be understood that the form of my invention herewith shown and described, is to be taken as a preferred example of the same, and that certain changes in the shape, size and arrangement of parts may be resorted to without departing from the spirit of the invention or the scope of the subjoined claim.

Having fully described my invention, I claim:—

A packing ring comprising a plurality of packing ring segments each of which is formed of relatively soft metal having a longitudinally curved coil spring embedded therein, the coil spring being suitably stiff and tending to retain the segment in its normal shape, the turns of the coil spring extending transversely of the segment.

In testimony whereof I affix my signature in presence of two witnesses.

ALBERT SODERLUND.

Witnesses:
J. C. GLOVER,
J. S. ELLINGTON.